United States Patent Office 3,394,893
Patented July 30, 1968

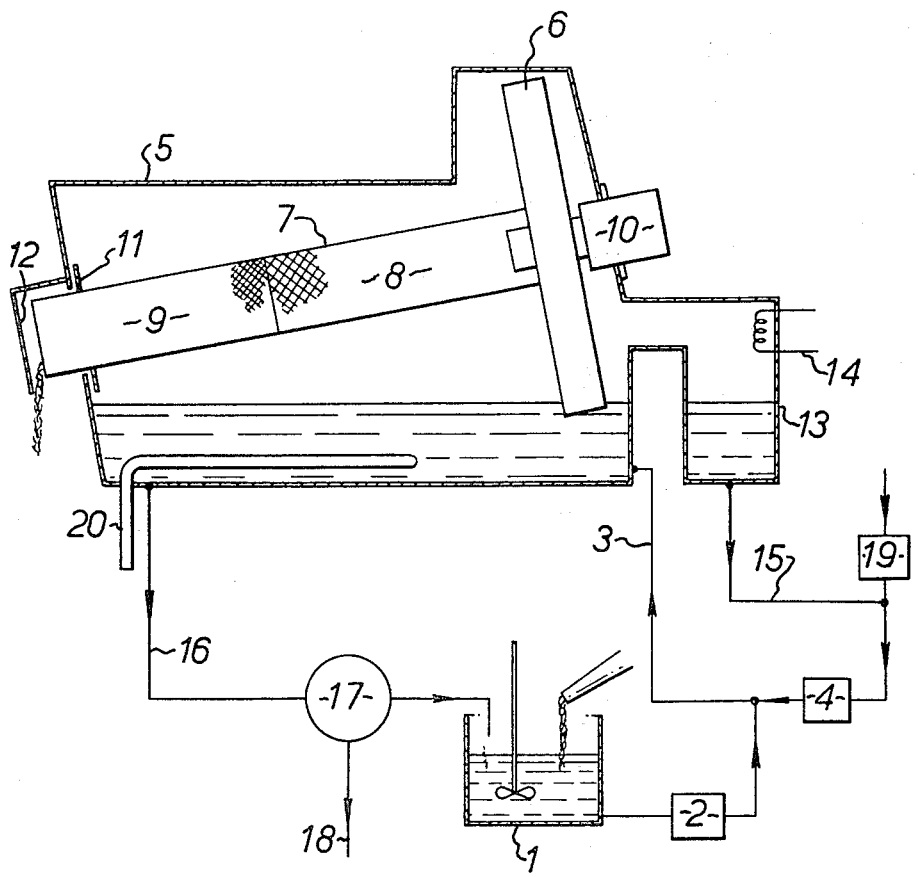

3,394,893
HEAT TREATMENT OF SURFACE ACTIVE
REAGENTS IN FLOTATION
Gerald Moss, North Oxford, and Edward Cyril Stockill, Sutton, near Eynsham, Oxford, England, assignors to Esso Research and Engineering Company, a corporation of Delaware
Filed June 10, 1965, Ser. No. 462,853
Claims priority, application Great Britain, June 11, 1964, 24,276/64; Apr. 29, 1965, 18,139/65
7 Claims. (Cl. 241—20)

ABSTRACT OF THE DISCLOSURE

Minerals are separated from an aqueous slurry or suspension by adding a minor amount of selected substantially water immiscible low boiling liquids and heating the mixture above the initial boiling point of the water immiscible liquid but below that of water so that the mineral is carried to the surface of the slurry or suspension.

---

This invention relates to the recovery of coal or other minerals from aqueous slurries and suspensions with the removal of dross material, such as ash or gangue, from them. The invention is particularly suited to the recovery of coal, although, as will be seen from the following description, it is not limited to coal recovery but may be applied to other minerals such as ores in general for example bauxite, phosphate rock, fluorspar, iron ores, copper ores, lead ores and zinc ores.

Amongst the objects of the invention are to improve and cheapen the removal of water from the aqueous slurries and suspensions aforesaid and, at the same time, to remove dross from the minerals such as the removal of ash and other impurities from coal, and gangue from ores.

In the invention there is added, to the aqueous slurry or suspension of the coal, or other mineral matter, a minor amount of a substantially water immiscible organic liquid, or liquid mixture (hereinafter referred to as the volatile liquid) which has a higher surface affinity for the coal or other mineral than has water, and which volatile organic liquid or liquid mixture, or a substantial proportion thereof, has a lower initial boiling point than the boiling point of water. The slurry or suspension to which the volatile organic liquid, or liquid mixture has been added, is then heated to a temperature below the boiling point of water, but at, or above, the initial boiling point of the volatile organic liquid whereby that portion of the feed material which has been wetted by the volatile organic liquid is carried to the surface of the slurry or suspension from which it may be recovered in known manner.

The separated mineral may be collected on a simple sieve or screen or by filtration, according to the particle size of the separated mineral matter; vacuum filtration may be used if considered necessary or desirable.

It is preferred that the separation be carried out in a continuous manner and the ratio of mineral to water by weight, in the slurry or suspension being fed into the flotation chamber, is suitably between 1:1 and 1:20, the ratio being limited on one hand by the pumpability of the slurry and the effect of dilution on the efficiency of separation, and on the other hand by the water consumption of the process.

In cases in which the major part of the mineral matter is caused to float, it is possible to use relatively concentrated slurries or suspensions since the capacity of the flotation chamber may be relatively large giving a long holdup time for the tailings which will be at a lower concentration than the floatable mineral matter so that the incoming slurry or suspension is diluted on entering the flotation chamber.

The slurry or suspension preferably contains not more than 50% solids by weight, advantageously less than 25%, and the mineral particles preferably do not exceed 1000 microns mean diameter. Whilst the average particle size of mineral may be as high as 800 microns it is preferably in the range from 50 to 400 microns.

The volatile organic liquid used to treat the aqueous suspension of coal or other mineral matter preferably comprises a petroleum hydrocarbon boiling in the light naphtha range, e.g., a light virgin naphtha having a boiling range from below 100° F. to a temperature not exceeding 300° F., although other organic water immiscible liquids having a higher surface affinity than water for the mineral particles and having a lower initial boiling point than water, may be used; examples of other suitable organic liquids are benzene, benzene homologues, solvent naphthas, straight chain hydrocarbons and naphthenes although it will be appreciated that other organic liquids having the specified properties may be used. The volatile organic liquid is present preferably in an amount to provide not less than 1% by weight, based on the weight of the coal or other mineral in the aqueous slurry or suspension, before the heating step is applied; particularly preferred is 5 to 25% by weight based on the weight of the coal or other mineral. The slurry or suspension may also contain a minor proportion of a hydrocarbon oil of much lower volatility, e.g. kerosene, a gas oil, or a residual fuel oil, which remains associated with the mineral, particularly with coal, during the whole of the process and prevents re-wetting of the mineral by water as the more volatile organic liquid evaporates.

The aqueous suspension or slurry may be treated with the volatile organic liquid by simple mixing, e.g., in a conventional mixing vessel with a stirrer, but the treatment is preferably effected by "in line" mixing in a suitable conduit leading to a vessel in which the mixture is then heated to cause flotation of the coal or other mineral. Mixing may be conducted at any convenient temperature below that which would initiate substantial vapourisation of the volatile organic liquid and ambient temperatures have been found to be suitable.

The solid matter which floats to the surface of the aqueous slurry or suspension may then be separated and collected by any suitable means e.g., by allowing it to spill over a weir, or by scooping it up continuously and then draining it on a screen, or by suction on a filter.

Using a light virgin naphtha having an initial boiling point below 100% F. it has been found sufficient to heat the treated suspension to a temperature in the range from 100° to 140° F. to cause flotation of the coal or other mineral. Any volatile organic liquid, e.g. naphtha, which evaporates from the mixture during the process may be condensed and recirculated.

As previously stated it has been found advantageous to add to certain systems, particularly those containing coal, preferably dissolved in the volatile organic liquid carrier, a proportion of an organic liquid of higher boiling point than water, e.g. kerosene, a gas oil or a residual fuel oil, hereinafter referred to as involatile organic liquid.

The involatile organic liquid serves two useful purposes; it not only reduces the loss of coal or other mineral matter retained during flotation in the aqueous phase but it also facilitates dewatering of the coal or other mineral matter which has been floated.

The amount of involatile organic liquid that it is advantageous to use will vary according to the quality and particle size of the coal or other mineral dispersed in the slurry and it may be in the range of up to 10 wt. percent based on the weight of coal or other mineral matter.

Particularly suitable involatile organic liquids have been found to be, for example, residual fuel oils of 3,500 S.S.U. viscosity at 100° F.; other suitable oils may include for example gas oils, phenol extracts, kerosene and coal tar.

It is also within the purview of the invention to use in the slurry, together with the volatile organic liquid, either with or without the involatile organic liquid, minor amounts of compounds used in mineral flotation techniques which are known to those skilled in the art and referred to as "Flotation Reagents." Such reagents are described for example in "Introduction to the Theory of Flotation," Klassen and Mokrousov, "Classification of Flotation Reagents," Table 20, p. 154 (Butterworth). These reagents may include, for example, oleic acid, sodium carbonate, lime, sodium ethyl xanthate, sodium alkyl sulphates, sulphuric acid, dextrin, starch, terpineol and phenol.

It has been found thus that the mixing energy required to cause wetting of coal or other mineral particles by the volatile organic liquid can be substantially reduced, and the loss of combustible material can also be reduced, by adding to the mixture a surface active compound which facilitates wetting of the particles by the volatile organic liquid and which helps to prevent re-wetting of the mineral by water. The surface active agent may be added in addition to, or in substitution for, the involatile organic liquid previously referred to and is preferably employed in concentrations of up to 0.2% by weight based on the weight of the mineral in the slurry or suspension. In the case of bituminous coals which have been stored in a pulverised condition, the use of anionic surface active compounds, which may be soluble in either the aqueous or organic phase of the mixture, has been found particularly suitable. Thus the stirring time necessary to reduce the loss of combustible solids to the same level has been found to be less by a factor of at least 5 when 0.002 weight percent by weight (based on water content of the mixture) of an anionic detergent (active ingredient) is added to the mixture. Moreover the absolute value of the loss of combustible solids can be reduced by a factor of at least 2 by the same addition. The volatile organic liquid used to obtain these comparisons was a light virgin naphtha containing a minor proportion of a 3,500 S.S.U. viscosity fuel oil.

It has also been found that adjustment of pH of the aqueous mineral slurry with such reagents as lime or sodium carbonate can be beneficial, but the limits of pH can vary since the optimum pH range is governed largely by the nature of the solid particles.

It may also be found advantageous for air or other suitable gas to be introduced into the flotation system to assist the flotation of solid particles.

The nature of the invention is further illustrated by the following examples:

EXAMPLE I

To a coal/water slurry containing 20% by weight of coal, having an average particle size of 230 microns, a particle size range of 40 to 700 microns and an ash content of 16.4% by weight, was added 25% (by weight of the coal) of a light virgin naphtha having the following characteristics.

|  | Degrees Fahrenheit |
|---|---|
| Initial boiling point | 85 |
| Distillation: | |
| 10% | 104 |
| 50% | 126 |
| 90% | 201 |
| Final boiling point | 297 |

The mixture was stirred thoroughly for 1 minute at 50° F. The mixture was then heated to 120° F. when agglomerates floated to the surface of the suspension and were scooped off and collected on a sieve. The separated coal contained 20 to 25% water by weight of the coal, and had an ash content of 10.2% by weight.

EXAMPLE II

A similar procedure to that of Example I was carried out on a coal of similar particle size distribution, but having an ash content of 28.3% by weight, using various quantities of light virgin naphtha as shown below. The following results were obtained:

|  | Percent LVN added (by weight of the coal) | Ash content of product (Percent by weight of coal) |
|---|---|---|
| A | 25 | 8.4 |
| B | 15 | 8.0 |
| C | 12½ | 12.3 |
| D | 8½ | 12.7 |

The water content of the products was again between 20 and 25% by weight of the coal.

EXAMPLE III

A similar procedure was carried out of the same coal as in Example II, using 25% LVN (based on the coal) containing small amounts of a fuel oil of 3500 sec. nominal S.S.U. viscosity at 100° F. The following results were obtained:

|  | Percent fuel oil (based on wt. of coal) | Product | |
|---|---|---|---|
|  |  | Water content (by wt. of coal) | Ash content (by wt. of coal) |
| A | 0.36 | 19.1 | 8.8 |
| B | 2.54 | 11.3 | 8.9 |

It will be seen that lower water contents were obtained, due to prevention of re-wetting of the coal particles, when fuel oil was used.

EXAMPLE IV

A similar procedure was carried out on a fine-ground coal having an average particle size of 75 microns, a particle size range up to a maximum of 300 microns and an ash content of 11.7%, using various quantities of LVN. No agglomerates were formed but a froth was formed which was skimmed off the surface of the suspension and suction filtered. A substantial amount of the coal remained unwetted and was recovered with the ash from the remainder of the suspension; the floated material had a much reduced ash content as shown by the following results:

|  | Percent LVN added (by wt. of coal) | Percent of total coal | | Ash content, percent by wt. of coal | |
|---|---|---|---|---|---|
|  |  | Floated | Unwetted | Floated | Unwetted |
| A | 10 | 40 | 60 | 3.8 | 13.7 |
| B | 20 | 45 | 55 | 3.3 | 16.1 |
| C | 30 | 72 | 28 | 4.0 | 22.0 |
| D | 40 | 70 | 30 | 3.8 | 19.2 |

EXAMPLE V

A similar procedure was carried out on the same coal as in Example IV using various quantities of LVN together with various amounts of the same fuel oil as used in Example III. Very much less coal remained unwetted as shown by the following results where the amount of coal unwetted is indicated by the amount of combustible material lost in the ash.

| | Percent LVN added | Percent fuel oil added | Percent combustible material lost | Product Ash content percent | Product Water content, percent |
|---|---|---|---|---|---|
| A | 10 | 10 | 26 | 3.8 | 21 |
| B | 20 | 10 | 4 | 4.6 | 23 |
| C | 30 | 0 | 22 | 4.0 | 26 |
| D | 30 | 2.5 | 7 | 4.2 | 23 |
| E | 30 | 5 | 4 | 4.7 | 23 |
| F | 30 | 7.5 | 3 | 4.8 | 23 |
| G | 30 | 10 | 4.5 | 4.7 | 20 |
| H | 40 | 10 | 3 | 3.6 | 23 |
| J | 50 | 10 | 4 | 4.2 | 23 |

All percentages are by weight based on the coal.

In test A of this example there was insufficient LVN to cause complete wetting of the coal. In test C, which corresponds to Example IV the absence of fuel oil caused incomplete wetting of the coal and loss of coal in the unfloated material.

EXAMPLE VI

A similar procedure was carried out on fine-ground coals having the same particle size distribution as in Example IV, but having different ash contents, using 50% LVN (based on the coal) and 5% fuel oil (based on the coal). Froth was skimmed off as in Examples IV and V and suction filtered. The following results were obtained:

| Percent Ash content of coal | | Water content of Product |
|---|---|---|
| Initial | Product | |
| 17.2 | 4.6 | 30 |
| 11.7 | 3.8 | 23 |
| 6.4 | 2.4 | 18 |

EXAMPLES VII–XIV

To a coal/water slurry having a pH of 7.6±0.2 and containing 20% by weight of a pulverised coal, having an average particle size of about 40 microns, a particle size range up to 420 microns and an ash content of 18% by weight, was added (in each example) a small quantity of an anionic detergent and then 30% (by weight of the coal) of a light virgin naphtha having the following characteristics:

$$\phantom{x} \degree F.$$

Initial boiling point _____ 84
Distillation:
    10% _____ 104
    50% _____ 126
    90% _____ 201
Final boiling point _____ 297 and 5% (by weight of the coal) of a fuel oil of 3500 nominal S.S.U. viscosity at 100° F.

The mixture was stirred thoroughly, at 60° F. for periods of from ½ to 3 minutes and then heated to 120° F., when a froth was formed which was skimmed off the surface of the suspension and suction filtered. Comparative tests A, B and C were also carried out in which no detergent was added and stirring times of from 1 to 5 minutes were used.

The results obtained are shown in the following table:

| Example or Test | Detergent added* | Mixing time (min.) | Percent loss of combustible solids | Ash content of product |
|---|---|---|---|---|
| VII | 0.002% "Teepol" | ½ | 14.9 | 5.3 |
| VIII | do | 1 | 5.0 | 6.3 |
| IX | do | 2 | 4.2 | 6.0 |
| X | do | 3 | 4.6 | 5.4 |
| XI | 0.004% "Teepol" | ½ | 9.4 | 5.2 |
| XII | do | 3 | 4.7 | 4.3 |
| XIII | 0.008% "Teepol" | ½ | 8.6 | 5.1 |
| XIV | 0.025% "Acto 636" | 3 | 4.2 | 5.3 |
| A | None | 1 | 17.5 | 6.1 |
| B | do | 3 | 10.7 | 7.3 |
| C | do | 5 | 9.2 | 6.4 |

*Percent by weight of active ingredients based on the water content of the mixture.
"Teepol" is a water-soluble sodium long-chain secondary alkyl sulphate.
"Acto 636" is an oil soluble sodium petroleum sulphonate.
"Teepol" and "Acto" are trademarks.

It is clear from the above results that, whereas a mixing time of 5 minutes is necessary to reduce the loss of combustible solids to below 10% in the comparative tests where no detergent was added, a mixing time of only 1 minute is required to reduce the loss to less than 5% when a small amount of detergent is added. The ash content of the products of the examples and tests was not significantly affected by the addition of detergent. The water contents of all the products were in the range 23 to 28% by weight.

EXAMPLE XV (Example of pH adjustment)

To a coal/water slurry containing 20% by weight of a pulverised coal, having an average particle size of about 40 microns, a particle size range up to 420 microns and an ash content of 18% by weight, was added a small quantity of anionic surface active agent (0.06 wt. percent active ingredients on weight of coal) and then 30% (by weight of the coal) of a light virgin naphtha having the following characteristics:

$$\phantom{x} \degree F.$$

I.B.P. _____ 84
Distillation:
    10% _____ 104
    50% _____ 126
    90% _____ 201
F.B.P. _____ 297 and 5% (by weight of the coal) of a fuel oil of 3.500 normal S.S.U. viscosity at 100° F. The mixture was stirred at 60° F. for 1 minute, when the procedure was followed substantially as described previously the flotation temperature being 120° F.

There was added to the mixture before mixing small amounts of sodium carbonate to adjust the pH of the mixture, as shown below:

| Na₂CO₃ as percent wt. of coal | pH of slurry | Treated coal ash, percent wt. | Combustible losses, percent wt. |
|---|---|---|---|
| 0 | 7.4 | 6.1 | 3.9 |
| 0.03 | 7.5 | 6.5 | 2.3 |
| 0.06 | 7.6 | 6.1 | 1.4 |
| 0.09 | 7.7 | 6.5 | 1.8 |
| 0.13 | 7.9 | 6.5 | 1.7 |
| 0.25 | 8.4 | 6.6 | 1.7 |
| 0.5 | 9.1 | 7.2 | 1.1 |
| 0.75 | 9.8 | 8.0 | 2.1 |
| 1.0 | 9.9 | 7.9 | 2.4 |
| 2.5 | 10.5 | 7.3 | 8.8 |

EXAMPLE XVI

To a coal/water slurry containing 20 wt. percent of a pulverised coal having an average particle size of about 310 microns and an ash content of 29.2% by weight, 15% (by weight of coal) of a light virgin naphtha having the following characteristics was added:

$$\phantom{x} \degree F.$$

Initial boiling point _____ 84
Distillation:
    10% _____ 104
    50% _____ 126
    90% _____ 201
Final boiling point _____ 297

The mixture was stirred thoroughly for 1 minute at 50° F. and then heated to 120° F. when agglomerates formed on the surface of the suspension and were removed. The following results were obtained.

Treated coal ash, wt. percent, 3.0. Combustible losses, wt. percent, 36.0.

EXAMPLE XVII

The procedure given in Example XVI was repeated, except that 5% weight on the coal of 3,500 S.S.U. viscosity fuel oil was dissolved in the light virgin naphtha.

The following results were obtained.

Treated coal ash, wt. percent, 6.3. Combustible losses, wt. percent 2.1.

EXAMPLE XVIII

The procedure given in Example XVI was again repeated except that 5% weight on the coal of a straight run petroleum gas oil was dissolved in the light virgin naphtha.

The following results were obtained.

Treated coal ash, wt. percent, 5.5. Combustible losses, wt. percent 2.8.

EXAMPLE XIX

The procedure given in Example XVI was repeated, except that 5% weight on the coal of kerosene was dissolved in the light virgin naphtha.

The following results were obtained.

Treated coal ash, wt. percent, 4.7. Combustible losses, wt. percent, 5.5.

EXAMPLE XX

Results of examination of the ash contents of various coals before and after treatment in accordance with the present invention are given below. In particular the results show that coals treated, substantially in the manner described in the invention using light virgin naphtha and 3,500 S.S.U. viscosity fuel oil as the volatile and involatile organic liquids respectively, enjoy an appreciable degree of removal of sulphur present mainly in the form of pyrites.

THE REMOVAL OF SULPHUR FROM COAL BY THE LVN FLOTATION PROCESS

| Coal | Ash, percent wt. | | Treated Coal Combustibles Loss, percent wt. | Sulphur, percent wt. dry ash free | | Treated Coal, Total | Percent Inorganic Percent Sulphur Removed |
|---|---|---|---|---|---|---|---|
| | Untreated Coal | Treated Coal | | Untreated Coal | | | |
| | | | | Total | Inorganic | | |
| 1 | 23.9 | 7.8 | 3.8 | 4.35 | 3.14 | 2.27 | 66 |
| 2 | 29.2 | 5.3 | 2.3 | 3.52 | 2.11 | 1.60 | 91 |
| 3 | 21.1 | 4.3 | 3.0 | 2.91 | 1.68 | 1.77 | 68 |
| 4 | 18.0 | 6.5 | 1.8 | 2.80 | 1.62 | 1.88 | 57 |

A suitable apparatus for carrying out the process of the invention in a continuous manner will now be described with reference to the accompanying drawing which is a diagrammatic representation of such an apparatus, by way of example only.

Powdered coal containing a proportion of ash, and which may be in the form of a slurry or suspension in water, is introduced into a mixing vessel 1 containing water, where it is brought to a suitable concentration of coal in suspension. The suspension is then pumped by a metering pump 2 to a mixing line 3. Light virgin naphtha or other suitable volatile organic liquid, is also fed into the mixing line 2 by a metering pump 4. This naphtha may contain a small proportion of fuel oil, or other much less volatile liquid than the naphtha. The mixture of naphtha and aqueous suspension of coal may be agglomerated by passage through the mixing line 1 and/or on entry into the closed process vessel 5. In the vessel 5, which preferably contains an inert atmosphere, it is heated to an appropriate temperature by a coil 20, heated by steam or other suiatble means, to partially evaporate the naphtha and cause the coal to float as agglomerates or as a froth to the surface of the aqueous liquid therein.

The floating coal is picked up by a scoop 6 which feeds the coal continuously to a rotating screen 7 comprising a coarse mesh region 8 and a fine mesh region 9. The scoop 6 and screen 7 are rotated continuously by the motor 10. Coal agglomerates are retained on the screen 7 but water drains back into the vessel 5. Ash from the coal sinks to the bottom of the vessel 5. Naphtha evaporating from the suspension is condensed in a condenser 13 cooled by a refrigerating coil 14.

De-ashed and de-watered coal retained by the rotating screen 7 is delivered as product through an extension of the screen 7 projecting through a baffle seal 11 in the end of the process vessel 5 and protected by a hood 12. Condensed naphtha passes by a line 15 to the metering pump 4 and is recirculated to the mixing line 3. Fuel oil is supplied by the metering pump 19. The ash from the bottom of the process vessel 5 is drawn off as an aqueous slurry through a line 16 and filtered continuously by a filter 17 which returns the water to the mixing vessel 1 and delivers the ash at 18.

As an alternative to the screen 7 a suitable from of vacuum filter drum may be employed.

The atmosphere in process vessel 5 is preferably inert and for example may be supplied by the exhaust from a diesel-driven heat pump which transfers heat from the refrigerating coil 14 to the heating coil 20.

When the mineral treated is coal, the product of the invention is a de-ashed coal having a low water content and in its preferred form consists of agglomerates containing a small amount of fuel oil which prevents the coal from being re-wetted by water. Thus the product of the invention may not only be used as feed directly to a coal-burning furnace, but may also be re-suspended in water for transport over long-distance, e.g., by pipeline, the coal agglomerates being easily separated from the water at the destination by simple screening or filtration to give a relatively dry product. The invention is adapted to the de-ashing and de-watering of aqueous coal-oil slurries before transportation, thus reducing transportation costs in proportion to the ash removal.

What is claimed is:

1. A flotation process for removing mineral particles from an aqueous system selected from the group consisting of slurries and suspensions of said mineral particles having a mean average diameter above about 40 microns which comprises adding to the system a minor amount of a substantially water immiscible organic liquid having a higher surface affinity for the mineral to be removed than water and having an initial boiling point lower than the boiling point of water and heating the system to a temperature below the boiling point of water but at least as high as the initial boiling point of the organic liquid, whereby the mineral is carried to the surface of the slurry or suspension, and recovering the mineral.

2. The process of claim 1 wherein a surface active agent is also added to said aqueous system to facilitate the wetting of said mineral particles by said water immiscible organic liquid.

3. The process of claim 1 wherein said mineral particles comprise coal particles having a mean average diameter ranging from about 50 to about 400 microns.

4. A process for separating a mineral from a mixture of the mineral and ash and gangue materials which comprises:

grinding the mixture into particles ranging less than about 1000 microns in diameter;

forming a system selected from the group consisting of aqueous slurries and aqueous suspensions of said particles;

dispersing in said system liquid organic material having a higher surface affinity for the mineral particles than water and containing a low-boiling constituent having a boiling point lower than the boiling point of water and a high-boiling constituent having a boiling point higher than the boiling point of water;

heating the system to a temperature between the boiling point of water and the boiling point of said low-boiling constituent, whereby said mineral particles are carried to the surface of said system;

and recovering said mineral particles.

5. The process of claim 4 wherein said liquid organic material comprises a hydrocarbon boiling in the light virgin naphtha range.

6. The process of claim 4 wherein said mineral is coal and said high-boiling constituent is provided in an amount ranging not more than about 10 wt. percent based on the weight of said coal.

7. The process of claim 6 wherein the mean average diameter of said coal particles ranges from about 50 to about 400 microns.

References Cited

UNITED STATES PATENTS

| | | | |
|---|---|---|---|
| 809,959 | 1/1906 | Kirby | 209—166 |
| 1,212,566 | 1/1917 | Schiechel | 209—164 X |
| 1,279,040 | 9/1918 | Thomas | 209—166 |
| 1,706,293 | 3/1929 | Holladay | 209—166 |
| 1,707,604 | 4/1929 | Fisher | 209—166 |
| 2,112,362 | 3/1938 | Gillson | 209—166 |
| 1,508,748 | 11/1917 | Scott | 209—166 |

FOREIGN PATENTS

| | | |
|---|---|---|
| 39,369 | 5/1886 | Germany. |
| 1,128,424 | 7/1956 | France. |

HARRY B. THORNTON, *Primary Examiner.*

R. HALPER, *Assistant Examiner.*